United States Patent [19]

Samiran

[11] 4,136,009

[45] Jan. 23, 1979

[54] ADJUSTABLE FLOAT AND FILTER ASSEMBLY

[76] Inventor: David Samiran, 148 Northwest Rd., Westfield, Mass. 01085

[21] Appl. No.: 852,515

[22] Filed: Nov. 17, 1977

[51] Int. Cl.² .......................................... B01D 29/36
[52] U.S. Cl. .................................... 210/114; 55/219; 210/128;456
[58] Field of Search .................. 55/219; 210/114, 111, 210/128, 456, 489; 137/195, 426, 428–430

[56] References Cited

U.S. PATENT DOCUMENTS

| | | | |
|---|---|---|---|
| 1,937,415 | 11/1933 | Sidney | 210/436 X |
| 2,307,498 | 1/1943 | Fleming | 210/115 |
| 2,311,697 | 2/1943 | Samiran | 210/115 |
| 2,613,812 | 10/1952 | Yancey | 210/114 |
| 3,378,993 | 4/1968 | Veres et al. | 55/219 |
| 3,528,546 | 9/1970 | McPherson | 210/489 X |

*Primary Examiner*—John Adee
*Attorney, Agent, or Firm*—Albert L. Jeffers

[57] ABSTRACT

An adjustable universal float for use with a liquid or fluid where a liquid is placed within the float as ballast so that the float can be adjusted to a particular specific gravity of the liquid, said float carrying a valve assembly for controlling the discharge of one or more liquids as desired from a filter housing. A deflector plate is positioned near the inlet chamber of the filter housing to direct the incoming liquid toward the inside wall of the filter housing and away from the filter element.

10 Claims, 3 Drawing Figures

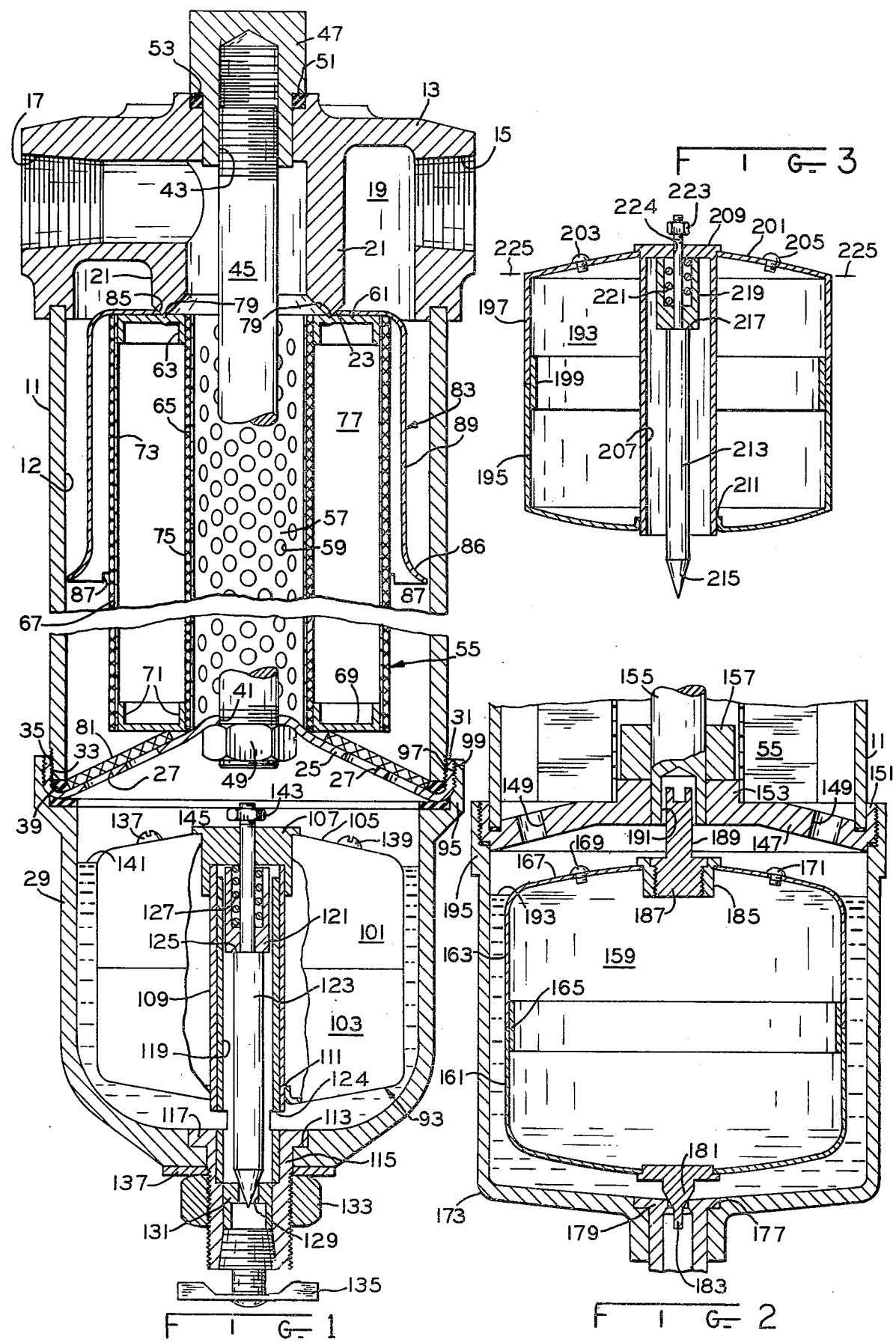

ADJUSTABLE FLOAT AND FILTER ASSEMBLY

BACKGROUND OF THE INVENTION

This invention relates to an adjustable universal float which can utilize any liquid as a ballast and can be adjusted to discharge one or more liquids. For example, when the float is used in a system for filtering air, the float can be adjusted to discharge both oil and water. On the other hand, when it is desired to separate oil and water, the float can be adjusted to discharge only water. Thus, when it is desired to discharge oil and water which are removed from an air line, the float is adjusted to the oil, whereby both the oil and water will be discharged. When the adjustable float is used in a filtering system for the removal of water from oil, the float is adjusted to the water so that the oil will not be discharged.

In the operation of pneumatically-controlled tape tools, air under pressure is supplied from a compressor to the machine to perform certain operations. The pneumatic-operated tools have been known to fail in the past due to contaminant carried by the compressed air. One of the contaminants in the compressed air is oil which escapes from the compressor. Since oil is a hydrocarbon, it has a tendency to produce a sulfur and hydrogen residue within the air line. Another contaminant in the form of water condensate is almost always present in air lines which when combined with the oil results in sulfuric and hydrochloric acid. The acid in turn will soften "O" rings and seals and will produce etching or pit marks on parts of the pneumatic operated tool. It has also been observed that when water and oil are mixed, an emulsion results, and when motion or heat is applied to the emulsion, it has a tendency to turn into varnish, which will affect the operation of any rotating or reciprocating part causing the part to be less effective in proportion with the degree of varnish to total surface area, or it may eventually stop the part from actually operating, thus, stopping the pneumatic tool.

Another recognized contaminant in air lines is in the form of pipe scale which will upon expansion and contraction of metal pipe cause the scale to leave its original position within the pipe and will travel toward the pneumatic tool. The pipe scale as it is being carried within the pipe will reduce in size and will mix with the oil or water, thus forming a grinding compound. The grinding compound will cause considerable wear upon any moving part with which it comes into contact.

On occasion it has been observed that a substantial amount of water is present in the air lines between the compressor and pneumatic tool, thus reducing the pressure required to properly operate the pneumatic tool.

FIELD OF THE INVENTION

It is a general object of this invention to provide an improved filter and adjustable universal float structure for the removal of the contaminant that is present in the air lines between a compressor and a pneumatic tool so that the tool will receive clean, dry air.

It is another object of this invention to provide an adjustable float which utilizes a liquid as a ballast and may be adjusted to the liquid which is desired to be discharged.

It is a still further object of this invention to provide a filter for removing liquid and solid contaminant from a fluid such as air which includes improved means in the form of an elongated deflector plate for directing the liquid toward the inside wall of the filter housing so that the liquid does not come into contact with the filter element which is mounted inside the filter housing, thereby increasing the effective life of the filter element.

It is a further object of this invention to provide an improved filter element for removing the abrasive and solid contaminants from the fluid being filtered.

These and other objects of this invention will appear hereinafter and are for purposes of illustration, but not of limitation.

SUMMARY OF THE INVENTION

The apparatus of this invention generally comprises a structure adapted to be mounted in an air line which runs between an air compressor and a pneumatic tool. The invention is more specifically concerned with the removal of both liquid and solid contaminants from the air before it reaches the pneumatic tool, thus insuring clean and dry air pressure to the pneumatic tool for operation of its intended parts, thereby providing a more reliable operating life cycle for the pneumatic tool.

In order to provide for rapid and reliable removal of the contaminants from the air, the apparatus of the invention provides an elongated filter housing having an inlet and a clear dry air outlet adapted to be connected to the air lines in close proximity to the pneumatic tool so that the air will flow into an upper chamber formed in the shape of an elbow. The elbow causes the compressed air and liquid to fan outwardly to surround a bell-shaped deflector plate having an elongated skirt for directing the air and liquid toward the inner wall of the filter housing, thus reducing turbulence and directing the air and liquid away from the filter element mounted within the filter housing. The air will flow through the filter element where the solid contaminant is removed and will flow upwardly through a center tube to the air outlet which is connected to the pneumatic tool. The liquid which may be oil and water, or a mixture thereof, will flow downwardly into a sump bowl where it is collected and will be discharged through a valve which is controlled by an adjustable universal float. The adjustable universal float is adjusted to the oil so that when the float operates both the water and oil will be discharged.

DESCRIPTION OF THE DRAWING

Specific embodiments of the invention are shown in the accompanying drawing in which:

FIG. 1 is a vertical fragmentary cross-sectional view of the filter and adjustable universal float characterized by the features of this invention;

FIG. 2 is a cross-sectional view illustrating the modification of the adjustable universal float; and FIG. 3 is a cross-sectional view illustrating another embodiment of the adjustable universal float.

Referring to FIG. 1 which best illustrates the assembly of parts which make up the apparatus of the invention, the reference numeral 11 designates an elongated filter housing having a head portion 13 provided with an inlet 15 and a clean air outlet 17. The head portion 13 is provided with an inlet chamber 19 having a hollow elbow-shaped partition 21 connected with the outlet 17. The elbow 21 is provided with a circular projection 23 which serves as a locator and seal as later described. The lower securing plate 25 contains a number of openings 27 to permit the liquid to pass into the sump or float housing 29. The plate 25 is provided with an upwardly directed flange 31 having a threaded portion 33 corresponding to the threads 35 on the filter housing 11. A gasket 39 is disposed between the filter housing 11 and lower plate 25. The plate 25 is dish-shaped and is provided with a central opening 41. The upper head portion 13 is provided with a central opening 43 in alignment with the opening 41 in the plate 25 to receive a tie bolt 45. The tie bolt 45 is provided with a hex head 47 and a nut 49. The tie bolt 45 maintains the head portion 13, housing 11, and lower plate 25 in an assembled condition. A gasket 51 disposed in the recess 53 provides a seal between the hex head and head portion 13.

A filter element 55 for removing abrasive and solid contaminants is disposed within the filter housing 11 between the head portion 13 and the lower plate 25. The filter element 55 is provided with a perforated center tube 57 having openings 59 spaced at random to permit the air to flow therethrough. A doughnut-shaped upper support plate 61 has downwardly turned flanges serving as spacers for the filter media 65 and 67. The filter media 65 is constructed of a stainless steel wire cloth having a mesh of approximately 400. The outer filter media is of substantially the same material having a larger mesh of approximately 300. The lower doughnut support plate 69 is provided with upwardly turned flanges 71 corresponding to the flanges 63 on the upper plate 61. A perforated cylinder supports the outer filter media 67, and an inner perforated cylinder 75 supports the filter media 65. The perforated cylinders 73 and 75 are spaced to provide an inner chamber 77. The support plate 61 is provided with a recess 79 to receive the projection 23 which serves as a locator and seal between the elbow 21 and the filter element 55.

A secondary filter 81 is positioned on the upper surface of the plate 25 and prevents any solid contaminant from flowing into the sump.

A bell-shaped deflector plate 83 is carried by the top plate 61 of the filter element and is provided with a central opening 85 adapted to receive the projection 23 which centers and locates the deflector plate with respect to the filter element 55 and the inner wall 12 of the filter housing. The deflector plate 83 is provided with an outwardly directed flared portion 86 which has a clearance of about 0.020 between the periphery of the flange and the inner wall 12 of the filter housing or casing. A number of spaced slots or grooves 87 are formed on the periphery of the flared portion 86. The slots or grooves have a clearance of approximately 0.030 from the inner wall 12 of the filter housing. The deflector plate 83 is provided with an elongated skirt 89 so that the liquid will have a tendency to flow down the inner wall of the filter housing and not enter the filter element 55, thereby increasing the effective life of the filter element.

The adjustable universal float assembly 93 is mounted in the sump or float housing 29 and is adapted to discharge the liquid when it reaches a predetermined level. The sump housing 29 is provided with a cylindrical flange 95 having threads 97 which correspond to threads 99 disposed on the flange 31 for securing the float housing to the filter casing 11. The float is constructed of two cup-shaped members 101 and 103 which are secured together to form a hollow float. The member 101 is provided with a dome portion 105 which controls the buoyancy level of the float. A cylindrical flange 107 is secured in the center of the dome 105 and is adapted to receive the upper end of the cylindrical guide member 109. The lower end of the guide 109 is secured to the float at 111. The float housing 29 is provided with a recess 113 for receiving a bushing 115 having a flange 117. The bushing 115 supports the float guide 119 which is provided with a cylindrical recess opening 124. The float drain guide 119 is adapted to be received within the guide member 109. A spring cup member 121 is carried by the valve stem 123 which is recessed at 125 to provide a shoulder for supporting the cup member 121. A spring 127 is carried by the cup member and is in engagement with the flange or bushing 107. A valve seat 129 is carried by the bushing 115 and is adapted to receive the needle valve 131. The lock nut 133 secures the bushing 115 to the float housing 29.

A manually operated petcock 135 is mounted on the outer end of the bushing 115 and is normally open. A gasket 137 is positioned between the lock nut 133 and the float housing 29.

The float is provided with adjusting plugs 137 and 139 wherein the adjusting plug 137 serves as a liquid inlet, and the adjustment plug 139 serves as a vent. A liquid ballast is placed inside of the float until such time as the float reaches the buoyancy level 141, at which time both plugs are closed. For example, if it is desired to discharge both oil and water, the float is adjusted to the oil because the oil floats on top of the water; therefore, when the float is adjusted to the oil, both the water and oil will be discharged from the sump. The spring 127 serves to maintain the needle valve 129 in engagement with the seat to prevent accidental drainage due to vibrations from the air compressor or other machinery. The valve stem 123 is threaded at 145 to receive an adjusting nut 143.

When the filter is connected in an air line between a pneumatic tool and a compressor, the incoming fluid which may be substantially compressed air, or a mixture of air and some lubricating oil, and water enters the filter through the tangentially disposed inlet 15 to the inlet chamber 19. The elbow-shaped partition 21 causes the incoming air and liquids to fan outwardly and downwardly between the deflector plate 83 and the inner wall 12 of the filter casing 11. The elongated skirt 89 of the deflector plate functions to guide the liquid downwardly and away from the filter element, and the flared portion 86 will direct the liquid toward the inside wall 12 of the filter housing 11. The liquid will flow through the slots 87 of the flared portion 86. The air will flow through the filter element from outside in through the center tube 57, and then the clean, dry air will flow from outlet 17 to the pneumatic tool. The liquid will flow through the secondary filter 81 into the sump 29, and when the liquid reaches the predetermined buoyancy level 141, any additional liquid will then operate the float 93 to unseat the needle valve 129 to discharge the liquid.

Referring to FIG. 2, a modification of the adjustable universal float is illustrated. The lower plate 147 is provided with drain openings 149 and is secured to the filter housing 11 by an upturned, flared threaded portion 151 as disclosed in FIG. 1. The lower plate 147 is provided with a boss 153 for receiving the tie rod 155. The tie rod 155 is provided with a nut 157. The float 159 is formed of cup members 161 and 163 secured together by an inner ring 165. The upper member 163 is provided with a dome 167 having adjustable plugs 169 and 171 for providing a liquid ballast to the hollow float as described with respect to the float in FIG. 1. The sump housing 173 is provided with a flange portion 175 which is provided with threads to be connected to the lower plate 147 as described in FIG. 1. The bottom portion of the sump housing is provided with a recess 177 to receive a valve seat 179. A valve 181 is carried by the float 159 and is provided with an elongated guide tip 183. A threaded bushing 185 is secured to the dome 165 and is adapted to receive a threaded guide member 187. The guide member 187 is provided with an elongated stem 189 adapted to be received in the bore 191 provided in the tie rod 155. The operation of the modified float is substantially the same as that illustrated in FIG. 1 in that the float is provided with a liquid ballast through the adjustable inlet plug 169 and vent 171 until the float attains the buoyancy level illustrated at 193, at which time the plugs 169 and 171 are closed, and the float is now ready for operation.

Referring to FIG. 3, another modification of the adjustable universal float is illustrated. The float 193 is constructed of two cup members 195 and 197 secured together by an inner ring 199. The upper cup member 197 is provided with a top dome portion 201 having adjustable plugs 203 and 205 for providing the hollow float with liquid ballast as previously described. The float 193 is provided with a center guide tube 207 having a top plate 209 with a bore 224 secured to the dome portion 201. The guide 207 is secured to the bottom portion of the cup member 195 at 211. A valve stem 213 is provided with a needle valve 215. The valve stem 213 is provided with a shoulder portion 217 adapted to receive a spring cup member 219. A spring 221 is disposed within the cup member 219 and the plate 209 and serves to hold the needle valve in engagement with the valve seat to prevent the accidental drainage of liquid due to vibration. The upper portion of the valve stem is threaded to receive an adjustable nut 223. The operation of the float 193 is substantially similar to the float previously described in that the float is adjusted to the liquid to be discharged by inserting liquid ballast into the liquid float through the adjusting plugs 203, 205 until the float reaches the buoyancy level 225, at which time the adjusting plugs 203 and 205 are closed. The float is then in condition for operation.

It is to be understood that the adjustable universal float can be used with filters other than the one described in this application. For example, the adjustable float can be used with a mechanical segregator which takes advantage of the immiscibility of water and fuel and the difference in specific gravity which effects the separation of the two liquids. In this example, the float is adjusted to the water, and when sufficient water has accumulated in the sump housing, the float rises opening the discharge valve in the bottom of the bowl. The discharge valve in the bottom of the bowl remains open until the level of the water in the segregator or float bowl is lowered sufficiently for the float to descend and close the discharge valve. Thus, under normal operating conditions, the sump is always filled with water. Thus, the presence of water in the float housing has the additional advantage of providing a water seal to prevent possible drainage of fuel through the drain valve. In an operation of this nature, both the water and fuel flow under pressure into the inlet 15 of the filter, following the same path as the air and liquid previously described except that in this instance the fuel, having a lighter specific gravity than water, will flow through the filter element 55 to the outlet 17, while the water being heavier in specific gravity than fuel will flow to the sump 29 where it is discharged as previously described.

It will be understood that various changes and modifications may be made in the above-described apparatus without departing from the spirit thereof, particularly as defined in the following claims.

What is claimed is:

1. A filter removing liquid and solid contaminate from a fluid comprising, in combination, an elongated filter housing provided with a head portion having an inlet and an outlet disposed therein, said head portion having a downwardly directed circular partition with an opening communicating with the outlet, a filter element, means for supporting a said filter element within the housing a deflector plate mounted within the filter housing and positioned between the inlet and filter element for directing the incoming liquid toward the inside wall of the filter housing, said partition having a circular locator element for positioning the deflector plate with respect to the filter element, a float housing connected to the lower portion of the filter housing, said float housing having a drain opening in the lower portion thereof, an adjustable float for controlling the draining of the liquid removed from the fluid, said float being hollow and having a liquid inlet and a vent means for controlling the liquid inlet and vent, said float having a top dome portion whereby the float can be adjusted to the specific gravity of the liquid by filling part of the float with liquid so that the dome of the float has buoyancy in the liquid, a needle valve carried by said float, a valve bushing having a valve seat mounted in the opening of said float housing, said valve bushing adapted to support said needle valve and float within the float housing.

2. A filter as set forth in claim 1 wherein the deflector plate is cup-shaped with an outwardly turned flange portion adapted to slidably engage the inside wall of the filter housing, said flange portion having spaced openings to permit the liquid and fluid to flow therethrough, said deflector plate being positioned with respect to the filter element so that the liquid will flow downwardly along the inside wall of the filter housing.

3. A filter as set forth in claim 2 wherein a second filter is disposed between the filter housing and float housing.

4. A filter as set forth in claim 1 wherein said needle valve includes an elongated valve stem having spaced radial flanges and guide means for receiving said radial flanges for aligning the needle valve with said valve seat.

5. A filter as set forth in claim 4 including spring means for urging the needle valve into engagement with the valve seat to prevent accidental drainage of the water.

6. A filter as set forth in claim 1 wherein the filter element includes a perforated center tube having a first support plate mounted on one end and a second support plate mounted on the other end, said support plates having spaced flanges for supporting two concentric perforated cylinders, a first wire mesh filter cloth disposed around the inner perforated cylinder and a second wire mesh filter cloth disposed around the outer perforated cylinder, said concentric perforated cylinders being spaced to form a chamber therebetween.

7. A filter as set forth in claim 6 wherein the first support plate is provided with a circular recess on its outer face for receiving a locator element for positioning the filter element within the housing.

8. An adjustable float for use with a liquid wherein the liquid is used as a ballast within the float to provide the buoyancy level of the float comprising, in combination, a closed hollow bowl member having a liquid inlet and a vent, means for opening and closing the liquid inlet and vent, said bowl member having a top dome whereby the float can be adjusted to the specific gravity of the liquid by filling the hollow bowl with a portion of the liquid so that the dome of the float has buoyancy in the liquid, a valve assembly having a first bushing mounted in the center of the dome for supporting a first guide cylindrical member, a second guide cylindrical member adapted to telescope within the first guide member, a float housing having an opening in the lower portion thereof, a second bushing mounted in the opening of the float housing, said second bushing adapted to support the second guide member, a valve seat carried by said second bushing and disposed adjacent the lower end of the second guide member, a needle valve having an elongated valve stem provided with upper and lower spaced radial flanges for slidably engaging the second guide member so that the needle valve will be in alignment with said seat and spring means disposed between the first bushing and the upper radial flange for urging the needle valve into engagement with said seat.

9. An adjustable float as set forth in claim 8 including a valve carried by the bottom wall of the float and a guide member mounted in the center of the top dome, said guide member having an upwardly extending projection adapted to be received in a locating member.

10. An adjustable float as set forth in claim 8 including a cylindrical guide member closed at the upper end and open at the lower end, a valve stem extending through said guide member, and spring means carried by the guide member for urging the valve stem downwardly.

* * * * *